(12) United States Patent
Saga (10) Patent No.: US 8,884,843 B2
(45) Date of Patent: Nov. 11, 2014

(54) IMAGE DISPLAY SYSTEM AND CONTROL METHOD THEREFOR

(75) Inventor: Yoshihiro Saga, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/462,193

(22) Filed: May 2, 2012

(65) Prior Publication Data

US 2012/0287176 A1 Nov. 15, 2012

(30) Foreign Application Priority Data

May 10, 2011 (JP) ................................. 2011-105321
Mar. 30, 2012 (JP) ................................. 2012-081127

(51) Int. Cl.
*G09G 5/00* (2006.01)
*G09G 5/02* (2006.01)
*G09G 5/10* (2006.01)

(52) U.S. Cl.
CPC ... *G09G 5/02* (2013.01); *G09G 5/10* (2013.01)
USPC .............................. 345/2.1; 345/690; 348/687

(58) Field of Classification Search
USPC ............. 345/2.1–2.3, 698–699; 348/460, 687
See application file for complete search history.

(56) References Cited

U.S. PATENT DOCUMENTS 7,535,466 B2 * 5/2009 Sampsell et al. .............. 345/204
8,031,231 B2 * 10/2011 Suga et al. ................ 348/211.99
2002/0169805 A1 * 11/2002 Edge .............................. 707/528
2007/0075971 A1 * 4/2007 Chun ............................. 345/158
2009/0128587 A1 * 5/2009 Komiya et al. ............... 345/690
2009/0141322 A1 * 6/2009 Tin ................................ 358/535
2009/0216760 A1 * 8/2009 Bennett ............................ 707/5
2012/0054664 A1 * 3/2012 Dougall et al. ............... 715/772

FOREIGN PATENT DOCUMENTS

JP 2008-288859 11/2008

* cited by examiner

*Primary Examiner* — Alexander Eisen
*Assistant Examiner* — Sanjiv D Patel
(74) *Attorney, Agent, or Firm* — Cowan, Liebowitz & Latman, P.C.

(57) ABSTRACT

An image display system is constituted by a server and a client apparatus. The server includes a storage unit that stores a plurality of illumination spectrum data after associating the data with values of adjustment parameters, an acquisition unit that acquires the present set value of an adjustment parameter of the client apparatus, a selection unit that selects, from among a plurality of illumination spectrum data stored in the storage unit, illumination spectrum data with a smallest difference between a value of the corresponding adjustment parameter and a value of the adjustment parameter acquired by the acquisition unit, a generation unit that generates image data representing appearance of an image pick-up object under illumination corresponding to the illumination spectrum data selected by the selection unit, and a delivery unit that delivers image data generated by the generation unit to the client apparatus.

20 Claims, 7 Drawing Sheets

IMAGE DISPLAY SYSTEM AND CONTROL METHOD THEREFOR

BACKGROUND OF THE INVENTION

1. Field of the Invention

The present invention relates to an image display system and a control method therefor.

2. Description of the Related Art

When images of art works, valuable goods or merchandise viewed in net shopping are displayed, faithful reproduction of the color of the object is required.

A method for resolving this problem is disclosed, for example, in Japanese Patent Application Publication No. 2008-288859. More specifically, Japanese Patent Application Publication No 2008-288859 discloses a method by which a spectral reflectance of an object is estimated on the basis of image pick-up conditions from image data obtained with a multiband camera, and the estimated spectral reflectance is multiplied by spectral data of random illumination light, thereby accurately reproducing the color of the object under random illumination.

A multiband camera is a camera that picks up an image of an object and acquires information on primary colors that are larger in number than the typical RGB primary colors.

When images are viewed for which the colors of the image pick-up object are wished to be faithfully reproduced, as in the case of images of art works, valuable goods, etc., the use of a multiband display employing primary colors that are larger in number than the typical RGB primary colors can be considered. However, where a case is considered in which the abovementioned images are viewed in a museum or at home, it is required that the colors of the image pick-up object be faithfully reproduced by using typical personal computer and monitor, rather than a special apparatus such as a multiband display.

SUMMARY OF THE INVENTION

Further, when the user (viewer) views an image by using a monitor, the monitor display characteristic (display brightness or display color) is adjusted according to the user's taste to enable comfortable viewing. For this purpose, the monitor or PC used for viewing images has a function of adjusting the monitor display characteristic.

Meanwhile, in order to reproduce faithfully the color of the object (in order to display an image which faithfully reproduces the color of the object on the monitor) it is necessary to match the monitor display characteristic with the display characteristic assumed by the person delivering the image data when the image data were created. When the user changes the monitor display characteristic, the monitor display characteristic does not match anymore the display characteristic assumed by the person delivering the image data. As a result, the color of the object cannot be faithfully reproduced.

Further, as described hereinabove, image data that can accurately reproduce the color of the object under random illumination can be obtained by multiplying the spectral reflectance of the object by spectral data of random illumination light. However, the operation of selecting the desired illumination from among a wide variety of illumination burdens the user.

Accordingly, the present invention provides a technique suitable for displaying an image faithfully reproducing the color of an object under the desired illumination, without burdening the user.

The present invention in its first aspect provides an image display system constituted by a server that delivers image data and a client apparatus that displays an image based on the delivered image data, wherein the client apparatus has a function of adjusting a display characteristic by using a value of an adjustment parameter that has been set; and the server has:

a storage unit that stores a plurality of illumination spectrum data after associating the data with values of adjustment parameters that can be set in the client apparatus;

an acquisition unit that acquires a present set value of the adjustment parameter of the client apparatus;

a selection unit that selects, from among a plurality of illumination spectrum data stored in the storage unit, illumination spectrum data with a smallest difference between a value of the corresponding adjustment parameter and a value of the adjustment parameter acquired by the acquisition unit;

a generation unit that generates image data representing appearance of an image pick-up object under illumination corresponding to the illumination spectrum data by using illumination spectrum data selected by the selection unit and data on spectral reflectance for each pixel; and a delivery unit that delivers image data generated by the generation unit to the client apparatus.

The present invention in its second aspect provides an image display system constituted by a server that delivers data on a spectral reflectance of each pixel and a client apparatus that generates image data from the delivered data on a spectral reflectance of each pixel and displays an image based on the generated image data, wherein the client apparatus has:

an adjustment unit that adjusts a display characteristic by using a value of an adjustment parameter that has been set;

a storage unit that stores a plurality of illuminati on spectrum data after associating the data with values of adjustment parameters that can be set;

a selection unit that selects, from among a plurality of illumination spectrum data stored in the storage unit, illumination spectrum data with a smallest difference between a value of the corresponding adjustment parameter and a present set value of the adjustment parameter;

a generation unit that generates image data representing appearance of an image pick-up object under illumination corresponding to the illumination spectrum data by using illumination spectrum data selected by the selection unit and the delivered data on spectral reflectance for each pixel; and a display unit that displays an image based on the image data generated by the generation unit.

The present invention in its third aspect provides a server that delivers image data to a client apparatus that displays an image based on the delivered image data, wherein the client apparatus has a function of adjusting a display characteristic by using a value of an adjustment parameter that has been set; and the server has:

a storage unit that stores a plurality of illumination spectrum data after associating the data with values of adjustment parameters that can be set in the client apparatus;

an acquisition unit that acquires a present set value of the adjustment parameter of the client apparatus;

a selection unit that selects, from among a plurality of illumination spectrum data stored in the storage unit, illumination spectrum data with a smallest difference between a value of the corresponding adjustment parameter and a value of the adjustment parameter acquired by the acquisition unit;

a generation unit that generates image data representing appearance of an image pick-up object under illumination corresponding to the illumination spectrum data by using illumination spectrum data selected by the selection unit and data on spectral reflectance for each pixel; and a delivery unit that delivers image data generated by the generation unit to the client apparatus.

The present invention in its fourth aspect provides a client apparatus that generates image data from delivered data on a spectral reflectance of each pixel and displays an image based on the generated image data, the client apparatus comprising:

an adjustment unit that adjusts a display characteristic by using a value of an adjustment parameter that has been set;

a storage unit that stores a plurality of illumination spectrum data after associating the data with values of adjustment parameters that can be set;

a selection unit that selects, from among a plurality of illumination spectrum data stored in the storage unit, illumination spectrum data with a smallest difference between a value of the corresponding adjustment parameter and a present set value of the adjustment parameter;

a generation unit that generates image data representing appearance of an image pick-up object under illumination corresponding to the illumination spectrum data by using illumination spectrum data selected by the selection unit and the delivered data on spectral reflectance for each pixel; and a display unit that displays an image based on the image data generated by the generation unit.

The present invention in its fifth aspect provides a control method for an image display system constituted by a server that delivers image data and a client apparatus that displays an image based on the delivered image data, with the client apparatus being configured to have a function of adjusting a display characteristic by using a value of an adjustment parameter that has been set, the control method comprising:

an acquisition step in which the server acquires a present set value of the adjustment parameter of the client apparatus;

a selection step in which the server selects, from among a plurality of illumination spectrum data stored in the storage unit after associating the data with values of adjustment parameters that can be set in the client apparatus, illumination spectrum data with a smallest difference between a value of the corresponding adjustment parameter and a value of the adjustment parameter acquired in the acquisition step;

a generation step in which the server generates image data representing appearance of an image pick-up object under illumination corresponding to the illumination spectrum data by using illumination spectrum data selected in the selection step and data on spectral reflectance for each pixel; and a delivery step in which the server delivers image data generated in the generation step to the client apparatus.

The present invention in its sixth aspect provides a control method for an image display system constituted by a server that delivers data on spectral reflectance for each pixel and a client apparatus that generates image data from the delivered spectral reflectance for each pixel and displays an image based on the generated image data, the control method comprising:

an adjustment step in which the client apparatus adjusts a display characteristic by using a value of an adjustment parameter that has been set;

a selection step in which the client apparatus selects, from among a plurality of illumination spectrum data stored in the storage unit after associating the data with values of adjustment parameters that can be set, illumination spectrum data with a smallest difference between a value of the corresponding adjustment parameter and a present set value of the adjustment parameter;

a generation step in which the client apparatus generates image data representing appearance of an image pick-up object under illumination corresponding to the illumination spectrum data by using illumination spectrum data selected in the selection step and the delivered data on spectral reflectance for each pixel; and a display step in which the client apparatus displays an image based on image data generated in the generation step.

In accordance with the present invention, an image that faithfully reproduces the color of the object under the desired illumination is displayed on the monitor, without burdening the user.

Further features of the present invention will become apparent from the following description of exemplary embodiments with reference to the attached drawings.

DESCRIPTION OF THE EMBODIMENTS

Practical Example 1

An image display system and a control method therefor according to Practical Example 1 of the present invention will be described below. The image display system according to the present example is constituted by a server that delivers image data and a client apparatus that displays images on the basis of the delivered image data. The client apparatus according to the present example has a function of adjusting the display characteristic (display brightness or display color (display color balance or color temperature)) by using values of preset adjustment parameters.

Figure 1:
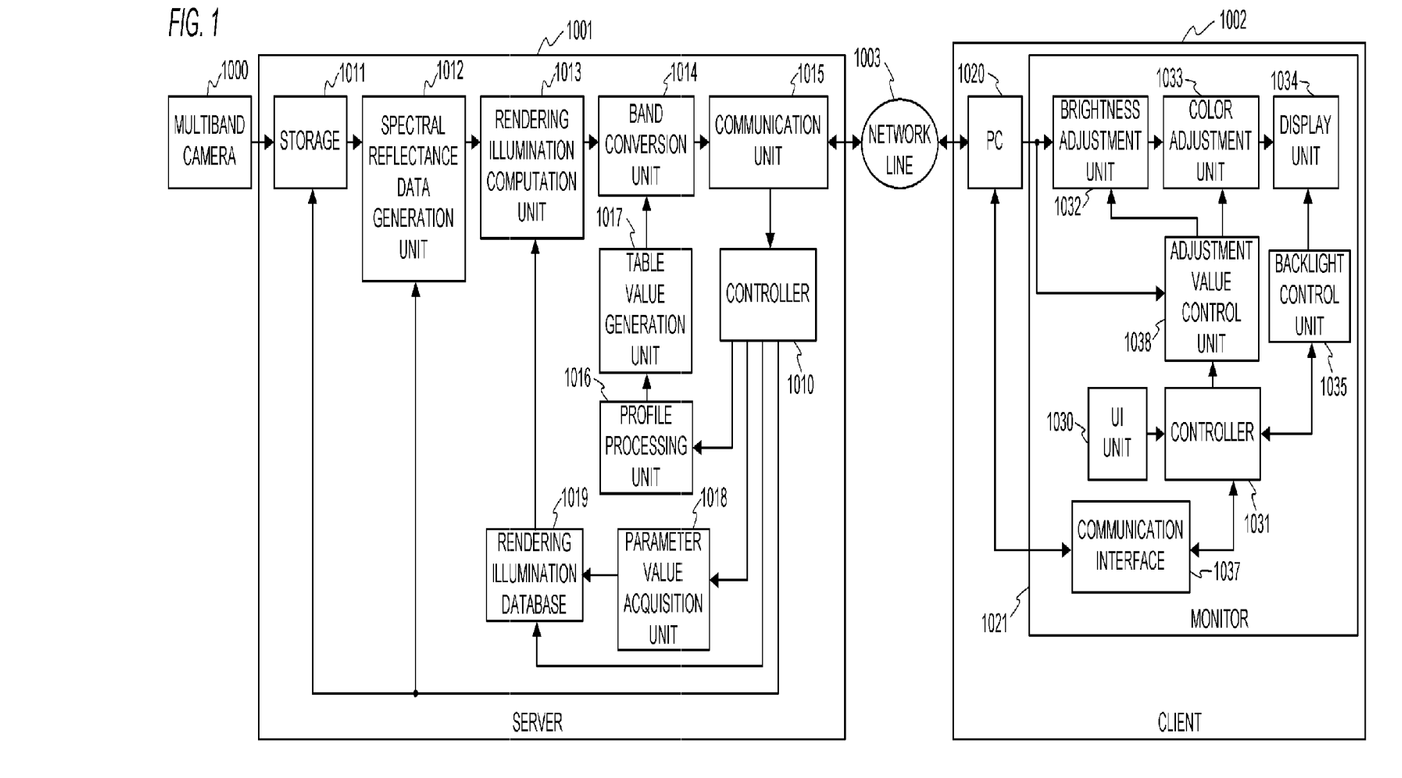
FIG. 1 is a block diagram illustrating an example of the configuration of the image display system according to Practical Example 1.

The configuration of the image display system according to Practical Example 1 will be explained below with reference to FIG. 1.

A multiband camera 1000 picks up an image of an object and generates multiband image data. The multiband camera is constituted by an image pickup element and a multiband filter.

The multiband image data are reflection spectrum data for each pixel. The multiband image data represent, for each pixel, spectral spectrum data (reflection spectrum data) of the object that are acquired by measuring the reflected light of the object for primary colors that are larger in number than three RGB primary colors.

Further, the multiband camera 1000 acquires, as image pickup condition information, the spectral data of illumination radiated on the object (data on spectral radiation; illumination spectrum data) and information on the relative positions of the object, illumination, and multiband camera 1000.

The multiband camera 1000 stores and outputs the multiband image data and the image pickup condition information corresponding thereto.

The server 1001, for example, stores a large number of multiband image data such as art works, and delivers the desired image data in response to the request from the client apparatus 1002. More specifically, the server 1001 stores data (multiband image data and image pickup condition information corresponding thereto) that have been acquired from the multiband camera 1000. Image data (image data that can be displayed by the client apparatus 1002; in the present example, RGB image data) for displaying on the client apparatus 1002 are then generated on the basis of the stored data, and the generated RGB image data are delivered to the client apparatus 1002.

The client apparatus 1002 serves for browsing (appreciating) the images based on the image data. The client apparatus 1002 requests the delivery of image data from the server 1001 and displays images based on the image data received from the server on a monitor.

A network line 1003 connects with a wire or in a wireless manner the server 1001 and the client apparatus 1002 and enables communication between the two.

The configuration of the server 1001 will be explained below.

A controller 1010 attains a series of functions of the server 1001 by controlling the below-described constituent elements.

A storage 1011 stores the multiband image data and image pickup condition information acquired from the multiband camera 1000. More specifically, illumination spectrum data during image pickup are acquired and stored as the image pickup condition information.

A spectral reflectance data generation unit 1012 reads the multiband image data and illumination spectrum data from the storage 1011 and performs the computation of canceling an illumination component from the multiband image data by using the illumination spectrum data. More specifically, the spectral reflectance data generation unit 1012 divides the reflection spectrum data for each pixel by the illumination spectrum data, thereby generating data (spectral reflectance data) on spectral reflectance for each pixel.

In the present example, the server 1001 is configured to store the multiband image data, but the server may be also configured to store the data on the spectral reflectance for each pixel.

Further, in the present example, the server 1001 is configured to acquire the multiband image data, but the server may be also configured to acquire the data on the spectral reflectance for each pixel.

A parameter value acquisition unit 1018 acquires a present set value of the adjustment parameter of the client apparatus 1002. The parameter value acquisition unit 1018 then sends the acquired value to a rendering illumination database 1019.

The rendering illumination database 1019 is a storage unit that stores a plurality of illumination spectrum data after associating the data with the values (user's adjustment values) of the adjustment parameters that can be set in the client apparatus 1002. More specifically, illumination spectrum data appended with the value of the adjustment parameter as an index are stored in the rendering illumination database 1019. A plurality of illumination spectrum data is a plurality of illumination spectra with different brightness value, color temperature, and spectral characteristic.

The rendering illumination database 1019, by using the value of adjustment parameter received from the parameter value acquisition unit 1018, selects and outputs one of a plurality of illumination spectrum data that will be stored. More specifically, the rendering illumination database 1019 compares the value of the adjustment parameter that has been received from the parameter value acquisition unit 1018 with the value of the adjustment parameter appended as the index. Then the rendering illumination database 1019 selects and outputs the illumination spectrum data with a smallest difference between the value of the corresponding adjustment parameter and the value of the adjustment parameter received from the parameter value acquisition unit 1018, from among the plurality of illumination spectrum data that will be stored. The illumination spectrum data selected by the rendering illumination database 1019 will be referred to hereinbelow as rendering illumination spectrum data, and illumination corresponding to the rendering illumination spectrum data will be referred to as rendering illumination.

Image data representing the appearance of the object under rendering illumination are generated by a rendering illumination computation unit 1013, a band conversion unit 1014, and a table value generation unit 1017 by using the rendering illumination spectrum data and spectral reflectance data for each pixel.

The rendering illumination computation unit 1013 uses the rendering illumination spectrum data and spectral reflectance data for each pixel to generate reflection spectrum data for each pixel. More specifically, the rendering illumination computation unit 1013 multiplies the spectral reflectance data for each pixel by the rendering illumination spectrum data, thereby generating multiband image data representing the appearance of the object under rendering illumination.

Multiband image data under the desired illumination can be generated by using illumination spectrum data corresponding to the user's desire.

When the user wishes to reproduce the appearance of the object under illumination of his/her own room, data identical to the illumination spectrum data of the illumination in his/her own room may be selected as the rendering illumination spectrum data. For example, the user may select the desired illumination spectrum data from illumination spectrum data such as bright illumination, dark illumination, sunlight, and artificial light. However, it would be difficult for the user to select the desired illumination spectrum data from a wide variety of illumination spectrum data. Further, it is highly probable that the rendering illumination spectrum data desired by the user, from among a plurality of illumination spectrum data that are stored, will be illumination spectrum data such that the brightness of image data is close to the display brightness of the monitor (that is, such that variations in the display brightness are minimized). Accordingly, in the present example, the rendering illumination spectrum data are determined (selected) by using, as described hereinabove, the present set value of the adjustment parameter of the monitor. As a result, multiband image data representing the appearance of the object under the desired illumination can be obtained without burdening the user. When the user thereafter desires to change the rendering illumination spectrum data, the rendering illumination spectrum data can be changed according to the user's request.

Image data (RGB image data) for displaying by the client apparatus 1002 (monitor 1021) are generated by the band conversion unit 1014 and the table value generation unit 1017 from the multiband image data, which have been generated by the rendering illumination computation unit 1013. More specifically, RGB image data for displaying by the monitor 1021 are generated from the multiband image data, which have been generated by the rendering illumination computation unit 1013, by using profile data representing the color reproduction characteristic of the client apparatus 1002 (monitor 1021). The color reproduction characteristic indicates which color is actually displayed with respect to the values (R value, G value, B value) of image data.

The band conversion unit 1014 generates RGB image data (faithfully reproduced image data) for displaying by the monitor 1021 from the multiband image data generated by the rendering illumination computation unit 1013 by using a lookup table (conversion table). The conversion table values (table values) are acquired from the table value generation unit 1017. The faithfully reproduced image data generated by the band conversion unit 1014 are delivered from the below-described communication interface 1015. More specifically, the faithfully reproduced image data generated by the band conversion unit 1014 are delivered after assigning a predetermined flag thereto.

The table value generation unit 1017 refers to profile data of the monitor 1021 that are stored by the below-described profile processing unit 1016 and generates table values that will be set in the conversion table in the band conversion unit 1014.

The table values are subjected to two conversions. One conversion is that from the multiband image data to RGB image data. The other conversion is that of correcting the RGB values of the RGB image data by using the profile data of the monitor 1021 so as to reproduce faithfully the color of the object when an image based on the RGB image data is displayed by the monitor 1021.

By performing band conversion (conversion from the multiband image data to the RGB image data) by using the profile data, it is possible to eliminate the difference between the expected displayed color and the actual displayed color of the monitor. As a result, it is possible to display on the monitor 1021 an image that faithfully reproduces the color of the object.

The profile processing unit 1016 acquires the profile data of the monitor 1021 via the communication interface 1015 and stores the acquired profile data. In the present example, the acquired profile data represent the color reproduction characteristic of the client apparatus when the set value of the adjustment parameter is the initial value.

The communication interface 1015 connects the server 1001 and a network line 1003 by a wire or in a wireless manner.

The configuration of the client apparatus 1002 is explained below.

A PC 1020 requests image data that the user wishes to browse from the server 1001, receives the RGB image data transmitted by the server 1001 and displays the image based on the received RGB image data on the monitor 1021.

For example, the PC 1020 is provided with browsing software. The user can use the browsing software to browse the general WEB sites, sites where the images picked up by a multiband camera have been posted and the video images included therein.

The monitor 1021 is an apparatus that displays images by using a liquid crystal display or the like and configured such that the display brightness and display colors can be adjusted.

The PC 1020 and the monitor 1021 may be configured as an integrated apparatus or separate apparatuses.

The configuration of the monitor 1021 is explained below.

A controller 1031 controls the operation of the monitor 1021.

A brightness adjustment unit 1032, a color adjustment unit 1033, and a backlight control unit 1035 adjust the display characteristic by using the set value of the adjustment parameter. The adjustment parameter may be set by the PC 1020 or by an adjustment unit provided in the monitor 1021.

The brightness adjustment unit 1032 adjusts the brightness (display brightness) of the displayed image by multiplying the RGB image data inputted from the PC by a gain value or by adding an offset thereto.

The color adjustment unit 1033 adjusts the balance (displayed color) of RGB in the displayed image by multiplying the RGB image data inputted from the PC by a gain value or by adding an offset thereto for each RGB individually. Where the color balance is adjusted, the color temperature of white color is also adjusted.

The backlight control unit 1035 adjusts the quantity of light of the backlight provided in a display unit 1034.

The display unit 1034 is a display apparatus that displays images based on RGB image data. In the present example, a liquid crystal display is used as the display unit 1034.

A UI unit 1030 receives user's operations. The UI unit 1030 is configured by a switch and a circuit that transmits the state of the switch.

The communication interface 1037 connects, by a wire or in a wireless manner, the monitor 1021 and the PC 1020.

The controller 1031 acquires the state of the UI unit 1030 and information from the communication interface 1037 and controls the operation of the monitor.

An adjustment value control unit 1038 performs control of changing (disabling the change of the set value of the adjustment parameter from the initial value (change of the display characteristic from the initial characteristic)) the set value of the adjustment parameter to the initial value when an image based on the delivered faithfully reproduced image data is displayed. More specifically, the adjustment value control unit 1038 changes the set value of the adjustment parameter to the initial value when the aforementioned predetermined flag has been added to the delivered image data. Further, the adjustment value control unit 1038 performs the above-mentioned control according to the coordinate position on the screen. More specifically, the adjustment value control unit 1038 counts synchronizing signals of the RGB image data inputted from the PC 1020 and compares the coordinate position of the processing target with the coordinate position of the non-initialization region inputted from the controller 1031. Then, the adjustment value control unit 1038 uses the comparison result to control the value of the adjustment parameter that will be outputted (set). More specifically, in the non-initialization region, the set value of the adjustment parameter is maintained as is, and in other regions (initialization region), the set value of the adjustment parameter is changed to the initial value.

With the monitor of such a configuration, the user can adjust the display characteristic of the monitor according to his/her own preferences. For example, when the screen seems to be too bright, the display brightness can be reduced, and when the screen seems to be dark, the display brightness can be increased. When the color of the displayed image differs from the color intended by the user, the display brightness of RGB colors can be adjusted so as to bring the color of the displayed image close to the color intended by the user. When the color of the display image is wished to be brought close to the printing results of a printer (color of the image printed on the printer), the display brightness and color balance can be adjusted, while comparing the displayed image with the printing result of the printer, so as to decrease the difference therebetween.

However, in the present example, the faithfully reproduced image data are created by using the profile data representing the color reproduction characteristic when the set value of the adjustment parameter is the initial value. Therefore, when the set value of the adjustment parameter has been changed from the initial value, the color reproduction characteristic represented by the profile data becomes different from the present color reproduction characteristic of the monitor. As a result, the color of the image displayed on the basis of the faithfully reproduced image data becomes different from the expected color. Thus, an image in which the color of the object is faithfully reproduced cannot be displayed.

Accordingly, in the present embodiment, when the image based on the delivered faithfully reproduced image data is displayed, the set value of the adjustment parameter is changed to the initial value. As a result, it is possible to display the image in which the color of the object is faithfully reproduced (the color displayed by the monitor can be matched with the expected color).

The operation of the image display system of the present example is explained below.

The PC 1002 acquires the desired image data from the server 1001 in response to the user's operation. The PC 1002 then displays the image based on the acquired image data on the monitor 1021.

In this case, the PC 1002 transfers the profile data of the monitor 1021 and the present set value of the adjustment parameter to the server 1001. The server 1001 uses these values to generate image data that will be transmitted to the client apparatus 1002.

Figure 2:
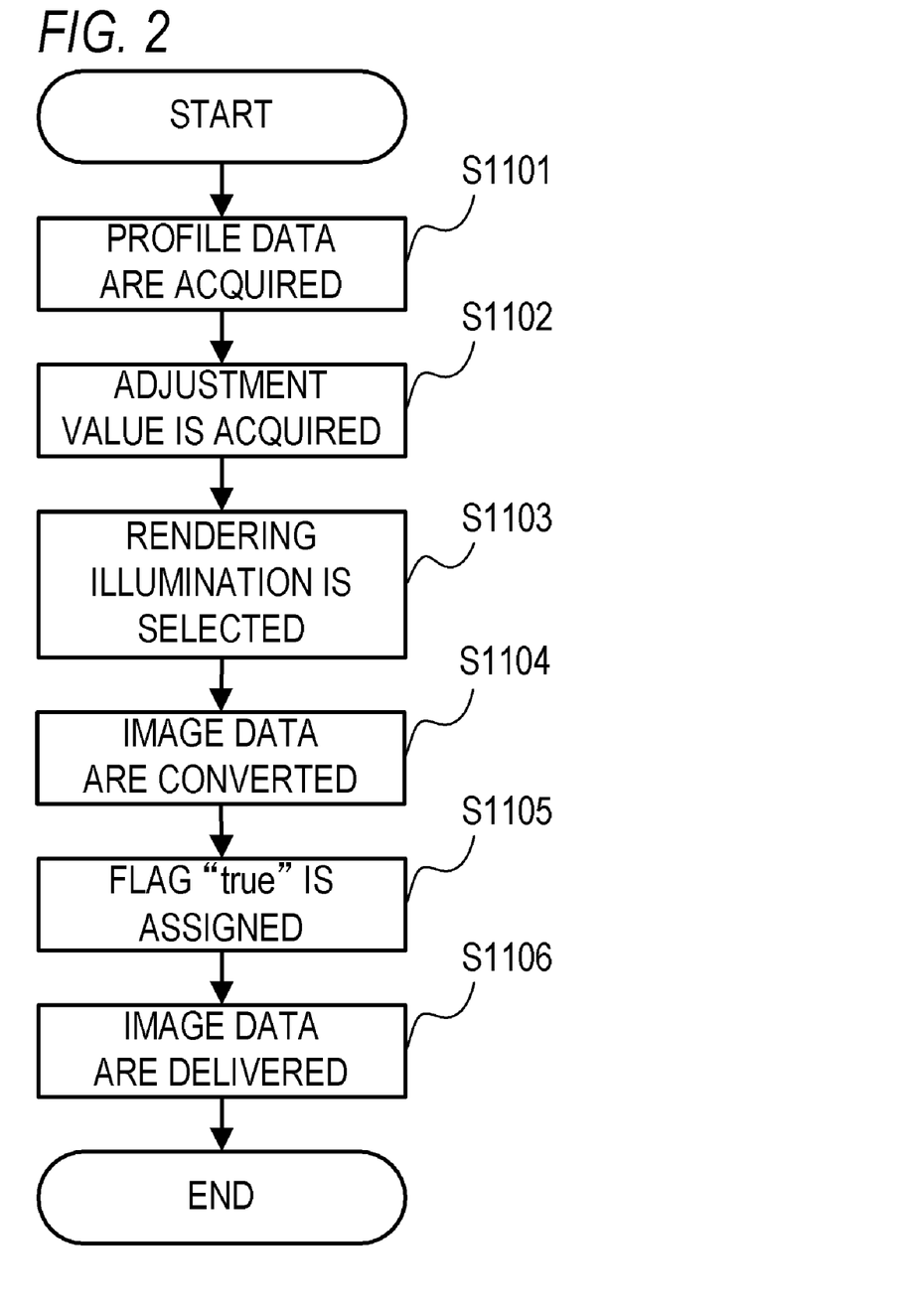
FIG. 2 is a flowchart illustrating an example of the operation flow of the server according to Practical Example 1.

The operation of the server 1001 will be explained below in greater detail. FIG. 2 shows the flow of operations performed by the server 1001. The server 1001 starts the processing shown in FIG. 2 in response to the image data acquisition request from the client apparatus 1002.

First, the controller 1010 requests profile data of the monitor from the client apparatus 1002 (S1101). The PC 1020 transmits the profile data of the monitor 1021 to the server 1001 in response to this request. The transmitted profile data are stored in the profile processing unit 1016. Then, the controller 1010 controls the table value generation unit 1017 to generate table values that use the profile data stored in the profile processing unit 1016.

The controller 1010 then requests that the client apparatus 1002 transmit the present set value of the adjustment parameter (S1102). The PC 1020 acquires the present set value of the adjustment parameter from the monitor 1021 in response to this request and transmits the acquired set value to the server 1001. When the adjustment parameter of the monitor 1021 has been stored in the PC 1020, the PC 1002 transmits the adjustment parameter to the server 1001. The transmitted adjustment parameter value is stored in the parameter value acquisition unit 1018. In the present example, the brightness adjustment value and color temperature adjustment value are acquired as the values of the adjustment parameter. The brightness adjustment value is a value representing the display brightness when the R value, G value, and B value of RGB image data are at respective maximums. The color temperature adjustment value is a color temperature obtained from the R value, G value, and B value representing the white color. The color temperature adjustment values also may be R value, G value, and B value representing the white color.

The controller 1010 then controls the rendering illumination database to select one of the illumination spectrum data, which have been stored in the rendering illumination database 1019, as rendering illumination spectrum data (S1103).

More specifically, the illumination spectrum data that have been associated with the value of the adjustment parameter that is the closest to the value of the adjustment parameter stored in the parameter value acquisition unit 1018 are selected as the rendering illumination spectrum data.

As a result, for example, when the brightness adjustment value is high, the illumination spectrum data of bright illumination are selected as the rendering illumination spectrum data. When the brightness adjustment value is low, the illumination spectrum data of dark illumination are selected. When the color temperature adjustment value is high, the illumination spectrum data of illumination with strong bluishness are selected. When the color temperature adjustment value is low, the illumination spectrum data of illumination with strong reddishness are selected.

The selected rendering illumination spectrum data are supplied from the rendering illumination database 1019 to the rendering illumination computation unit 1013. The controller 1010 controls the rendering illumination computation unit 1013 to multiply the spectral reflectance data by the rendering illumination spectrum data. As a result, multiband image data reproducing accurately the appearance of the object under rendering illumination are generated. In this case, the spectral reflectance data are generated by dividing the multiband image data of the target transmitted by the spectral reflectance data generation unit 1012 to the client apparatus 1002 by the illumination spectrum data during image pickup.

The controller 1010 then controls the band conversion unit 1014 to perform conversion of the multiband image data generated in S1103 into the RGB image data (faithfully reproduced image data) by using the table values generated in S1101 (S1104).

The controller 1010 then sets "true" in the faithful reproduction flag and assigns the faithful reproduction flag "true" to the RGB image data (faithfully reproduced image data) generated in S1104 (S1105). The faithful reproduction flag indicates whether or not the image data are faithfully reproduced image data. When the image data of the transmission target are the image data that do not require the faithful reproduction of the color of the image pick-up object, "false" is set in the faithful reproduction flag and assigned to the image data.

The controller 1010 then controls the communication interface 1015 to transmit the RGB image data having the faithful reproduction flag assigned thereto in S1105 to the client apparatus (S1106).

Figure 3:
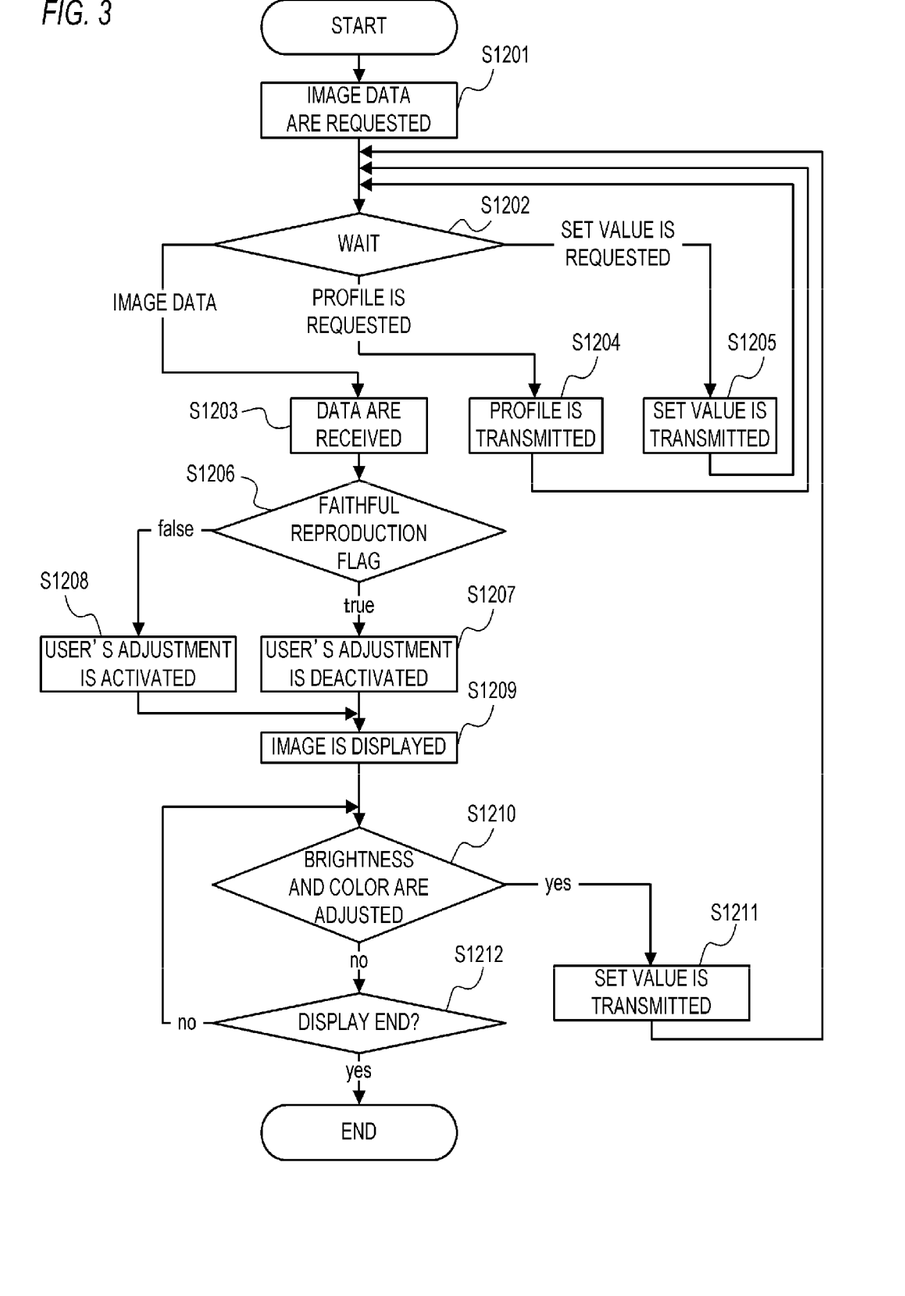
FIG. 3 is a flowchart illustrating an example of the operation flow of the client apparatus according to Practical Example 1.

The operation of the client apparatus 1002 will be described below in greater detail with reference to FIG. 3. FIG. 3 illustrates the operation flow of the client apparatus 1002. The client apparatus 1002 performs the processing shown in FIG. 3 in response to an image display request from the user. For example, when the user indicates image browsing by using browsing software, the PC starts the image display processing shown in FIG. 3 and displays an image on the monitor. The PC then waits for a next instruction from the user.

First, the PC 1020 requests image data from the server 1001 (S1201). As described hereinabove, when the server 1001 receives a request for image data from the client apparatus, the server requests the transmission of profile data of the monitor and the present set value of the adjustment parameter of the monitor from the client apparatus.

The PC 1020 waits for a request from the server in S1202.

When a profile data transmission request is received from the server, the PC transmits the profile data to the server 1001 (S1204).

When a request to transmit the present set value of the adjustment parameter is received from the server, the PC 1020 transmits the present set value of the adjustment parameter to the server 1001 (S1205).

When an image data reception request is received from the server, the PC receives the image data from the server 1001 (S1203).

After step S1203, the PC refers to the faithful reproduction flag assigned to the received image data and determines whether the image data to be displayed (the received image data) are faithfully reproduced image data (S1206).

When the faithful reproduction flag "true" has been assigned, the PC 1020 instructs the monitor 1021 to deactivate the user's adjustment (initialize the set value of the adjustment parameter) (S1207). This instruction is transmitted via the communication interface 1037 to the controller 1031 of the monitor 1021. The controller 1031 controls the adjustment value control unit 1038, thereby changing the set values of the adjustment parameters to the initial value with respect to the brightness adjustment unit 1032, color adjustment unit 1033, and backlight control unit 1035. As a result, the color reproduction characteristic of the monitor 1021 matches the color reproduction characteristic represented by the profile data that have been previously transmitted.

However, where the initialization of the set value of the adjustment parameter is performed with respect to the entire image, the display characteristic in the region outside of the display region of the image based on the image data received from the server suddenly changes. Therefore, the user can become uncomfortable.

Figure 4:
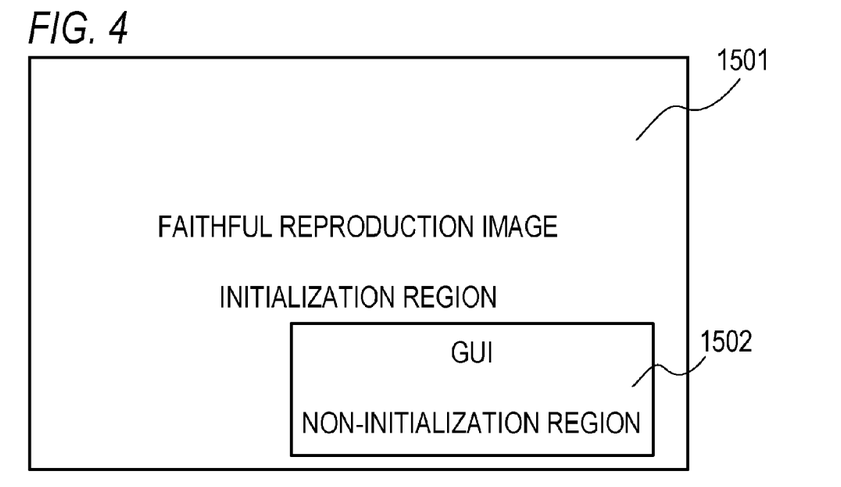
FIG. 4 illustrates an example of a region for initializing the adjustment parameter according to Practical Example 1.

Accordingly, in the present example, the controller 1031 determines a display region (or a region outside thereof) of the faithfully reproduced image data. Then, the adjustment value control unit 1038 performs the initialization of the set value of the adjustment parameter only with respect to the display region for the faithfully reproduced image data. The region denoted by the reference numeral 1501 in FIG. 4 is a region (initialization region) where the initialization of the set value of the adjustment parameter is performed, which is a display region of the image based on the faithfully reproduced image data. The region denoted by the reference numeral 1502 in FIG. 4 is a region (non-initialization region) where the initialization of the set value of the adjustment parameter is not performed, which is a GUI display region.

When the faithful reproduction flag "false" has been assigned, the PC 1020 instructs the monitor 1021 to activate the user's adjustment (S1208). When the activation of the user's adjustment has been instructed, the set value of the adjustment parameter remains the same.

After steps S1207 and S1208, the PC displays the image based on the image data received from the server 1001 on the monitor 1021 (display unit 1034) (S1209).

The PC 1020 then receives the readjustment of display brightness or display color performed by the user (S1210). For example, the user changes the set value of the adjustment parameter, while verifying the displayed image, so as to obtain the expected brightness or color of the displayed image.

When the set value of the adjustment parameter has been changed, the PC 1020 transmits the changed value to the server 1001 (S1211) and returns the processing to S1202. The image (expected image) corresponding to the set value of the adjustment parameter that has been updated can be displayed by a processing loop from S1210 to S1209 via S1211. For example, in the case where the set value of the adjustment parameter is changed when the faithfully reproduced image data are displayed, the server reselects the rendering illumination spectrum data by using the changed set value of the adjustment parameter. The faithfully reproduced image data are then generated by using the reselected rendering illumination spectrum data and the generated data are delivered.

The set value of the adjustment parameter is then changed to the initial value in the client apparatus, and an image based on the delivered faithfully reproduced image data is displayed. In the case where the set value of the adjustment parameter is changed when typical image data, which are not the faithfully reproduced image data, are displayed, the set value of the adjustment parameter remains the same (changed value) and an image based on the typical image data is displayed.

When the set value of the adjustment parameter has not been changed, the PC 1020 performs image display till an instruction to end the image display is received from the user in S1212. When the instruction to end the image display is received, the PC ends the present flow.

As indicated hereinabove, according to the present example, image data representing the appearance of the image pick-up object under illumination corresponding to rendering illumination spectrum data are generated by using the rendering illumination spectrum data and spectral reflectance data for each pixel. Thus, image data that accurately reproduce the optical characteristic of the object are generated. As a result, image data capable of faithfully reproducing the object color can be generated. More specifically, in the present example, image data for displaying by the client apparatus are generated from the reflection spectrum data of each pixel by using profile data representing the color reproduction characteristic of the client apparatus, and an image based on the generated image data is displayed. As a result, an image that faithfully reproduces the object color can be displayed.

Further, according to the present example, illumination spectrum data with the smallest difference between the value of the corresponding adjustment parameter and the present value of the adjustment parameter of the monitor, from among a plurality of illumination spectrum data that have been stored, are selected as the rendering illumination spectrum data. As a result, time and efforts required for the user to select the desired rendering illumination spectrum data can be saved, and an image that faithfully reproduces the color of the image pick-up object under the desired illumination can be displayed on the monitor, without burdening the user.

Where the display characteristic of the monitor is made identical to the display characteristic assumed by the person who delivered the image data when the image data were created, it is possible to display an image that faithfully reproduces the color of the image pick-up object. However, in the configuration in which only the display characteristic of the monitor is changed, rapid variations in the display brightness are sometimes induced. For example, where the display of a high-brightness image (for example, an image of the object that has been picked up under high-brightness illumination) is started from a state in which the user views typical contents (web and text) under somewhat dark illumination condition, an abrupt transition is made from a low value to a high value of display brightness of the monitor. Where the display brightness of the monitor thus changes abruptly, the user is strongly stimulated and can feel uncomfortable.

According to the present example, the rendering illumination spectrum data are determined on the basis of the present set value of the adjustment parameter of the client apparatus. The image data representing the appearance of the image pick-up object under the rendering illumination is then generated and displayed. More specifically, when the present set value of the adjustment parameter is a dark value, the image data representing the appearance of the image pick-up object under dark illumination is generated and displayed. When the set value of the adjustment parameter is such that relatively increases the level of red in the displayed color, the image data representing the appearance of the image pick-up object under illumination with a strong red color is generated and displayed. As a result, abrupt changes in the display characteristic of the monitor can be suppressed. For example, when multiband image data that have been obtained by picking up an image under bright illumination are selected as the display target, sudden display of a high-brightness image can be prevented. Accordingly, no feeling of discomfort is provided to the user.

Further, in the configuration of the present example, profile data are acquired from the client apparatus, but the profile data may be stored in advance in the server.

Further, in the configuration of the present example, profile data are used that represent the color reproduction characteristic of the client apparatus when the set value of the adjustment parameter is the initial value, but such profile data are not limiting. For example, it is also possible to use profile data that represent the color reproduction characteristic of the client apparatus at the present set value of the adjustment parameter. In the case of such a configuration, the processing of changing the set value of the adjustment parameter to the initial value when the faithfully reproduced image data are displayed is not performed.

Further, in the present example, the case is explained where the display color of the monitor is adjusted by adjusting the color balance, but it is also possible to adjust the display color of the monitor by adjusting the color temperature of white color.

Practical Example 2

An image display system and a control method therefor according to Practical Example 2 of the present invention will be described below. In Practical Example 1, the server corrects the faithfully reproduced image data (changes the illumination component), whereas in the present example, the client apparatus corrects the faithfully reproduced image data.

Figure 5:
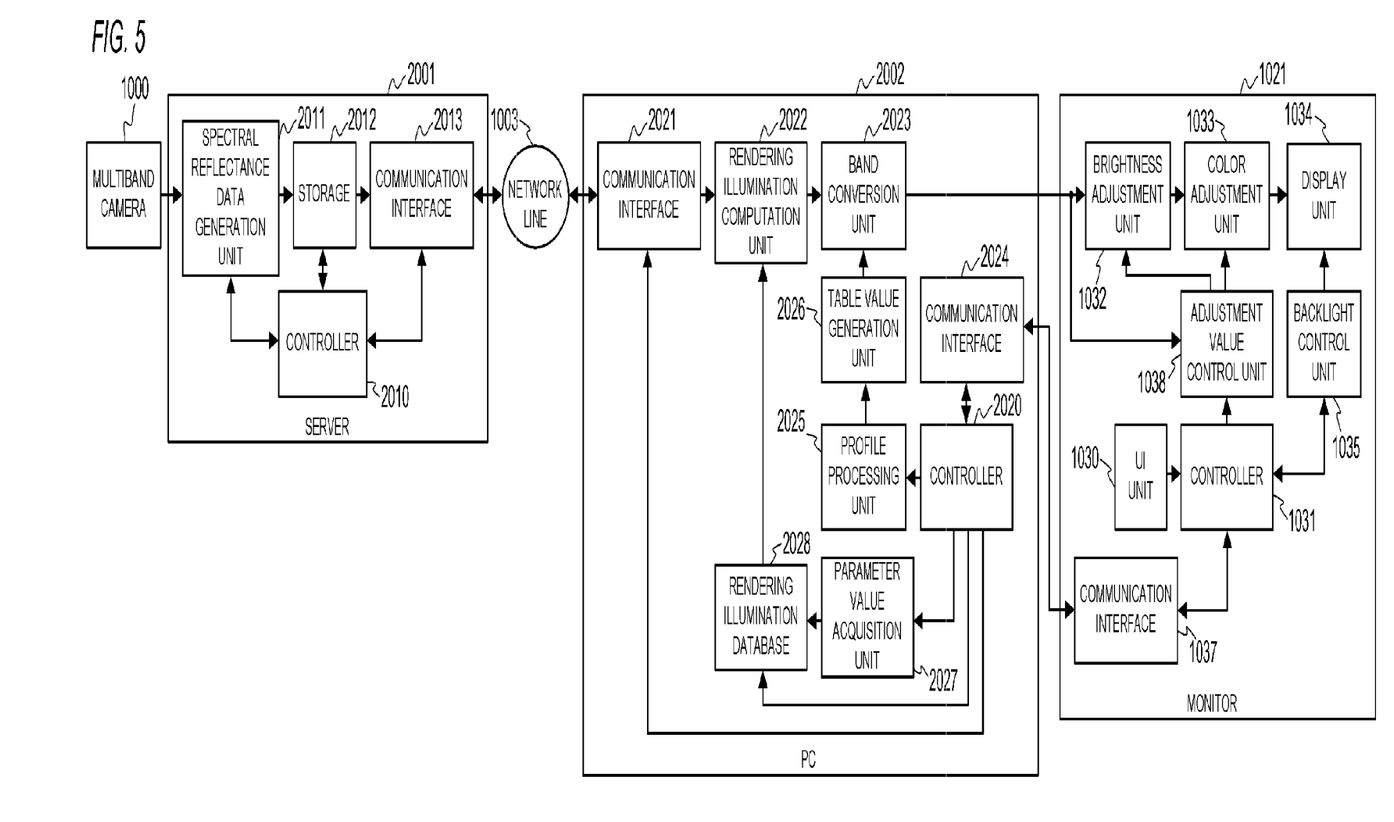
FIG. 5 is a block diagram illustrating an example of the configuration of the image display system according to Practical Example 2.

The configuration of the image display system according to Practical Example 2 is described below with reference to FIG. 5.

The multiband camera 1000, network line 1003, and monitor 1021 are same as in Practical Example 1 and the explanation thereof is herein omitted.

A server 2001 delivers spectral reflectance data for each pixel.

A PC 2002 generates image data from the delivered spectral reflectance data for each pixel and displays an image based on the generated image data on the monitor 1021. More specifically, the PC 2002 requests spectral reflectance data from the server in response to the user's operation. RGB image data are generated from the spectral reflectance data received from the server, and an image based on the generated RGB image data is displayed on the monitor 1021.

The configuration of the server 2001 is explained below.

A spectral reflectance data generation unit 2011 generates spectral reflectance data for each pixel from the multiband image data and image pick-up condition data (illumination spectrum data) acquired from the multiband camera, in the same manner as the spectral reflectance data generation unit 1012.

A storage 2012 stores the spectral reflectance data generated by the spectral reflectance data generation unit 2011. The storage 2012 outputs the stored spectral reflectance data when a request is received from the client apparatus. The spectral reflectance data outputted from the storage 2012 are delivered from the communication interface 2013 to the client apparatus.

The communication interface 2013 connects, by wire or in a wireless manner, the server and the network line. The communication interface receives a request from the client apparatus and delivers the spectral reflectance data to the client apparatus. More specifically, the spectral reflectance data for each pixel are assigned with a predetermined flag and delivered.

The controller 2010 controls each functional unit (constituent element) of the server.

The configuration of the PC 2002 is described below.

A communication interface 2021 connects, by wire or in a wireless manner, the PC and the network line. The communication interface 2021 requests the transmission of spectral reflectance data from the server 2001 and receives the spectral reflectance data transmitted by the server 2001.

A communication interface 2024 connects, by wire or in a wireless manner, the PC and the monitor.

A parameter value acquisition unit 2027 acquires the present value of the adjustment parameter of the monitor via the communication interface 2024. The parameter value acquisition unit 2027 then transmits the acquired value to a rendering illumination database 2028.

The rendering illumination database 2028 is a storage unit that stores a plurality of illumination spectrum data after associating the data with values of adjustment parameters that can be set in the monitor. More specifically, the illumination spectrum data to which the value of the adjustment parameter has been assigned as an index are stored in the rendering illumination database 2028. A plurality of illumination spectrum data is a plurality of illumination spectra with different brightness values, color temperature, and spectrum characteristic.

Further, the rendering illumination database 2028 selects and outputs one from a plurality of stored illumination spectrum data by using the value of the adjustment parameter received from the parameter value acquisition unit 2027. More specifically, the rendering illumination database 2028 compares the value of the adjustment parameter received from the parameter value acquisition unit 2027 with the value of the adjustment parameter assigned as an index. Then, the rendering illumination database 2028 selects and outputs illumination spectrum data with the smallest difference between the corresponding value of the adjustment parameter and the value of the adjustment parameter received from the parameter value acquisition unit 2027, from among the plurality of stored illumination spectrum data.

Image data representing the appearance of the image pickup object under the rendering illumination are generated by a rendering illumination computation unit 2022, a band conversion unit 2023, and a table value generation unit 2026 by using the rendering illumination spectrum data and the delivered spectral reflectance data for each pixel. The generated image data are outputted to the monitor. As a result, an image based on the abovementioned generated image data is displayed on the monitor.

The rendering illumination computation unit 2022 generates reflection spectrum data (multiband image data) for each pixel by using the rendering illumination spectrum data and the delivered spectral reflectance data for each pixel.

Image data (RGB image data) for displaying on the monitor 1021 are generated by the band conversion unit 2023 and the table value generation unit 2026 from the multiband image data generated by the rendering illumination computation unit 2022. More specifically, RGB image data for displaying on the monitor 1021 are generated from the multiband image data generated by the rendering illumination computation unit 2022 by using profile data representing the color reproduction characteristic of the monitor 1021.

The band conversion unit 2023 generates RGB image data (faithfully reproduced image data) for displaying on the monitor 1021 from the multiband image data generated by the rendering illumination computation unit 2022 by using the lookup table (conversion table). Values of the conversion table (table values) are acquired from the table value generation unit 2026. The faithfully reproduced image data generated by the band conversion unit 2023 are outputted from the communication interface 2024 to the monitor 1021.

The table value generation unit 2026 refers to the profile data of the monitor 1021 that are stored in the below-described profile processing unit 2025 and generates table values that are set in the conversion table of the band conversion unit 2023.

The profile processing unit 2025 acquires the profile data of the monitor 1021 via the communication interface 2024 and stores the acquired profile data. In the present example, it is assumed that the profile data are acquired that represent the color reproduction characteristic of the client apparatus when the set value of the adjustment parameter is the initial value.

The operation of the image display system according to the present example is explained below.

The PC 2002 acquires the desired spectral reflectance data from the server 2001 in accordance with user operation. The PC 2002 then generates RGB image data from the acquired spectral reflectance data and displays the image based on the generated image data on the monitor 1021.

Figure 6:
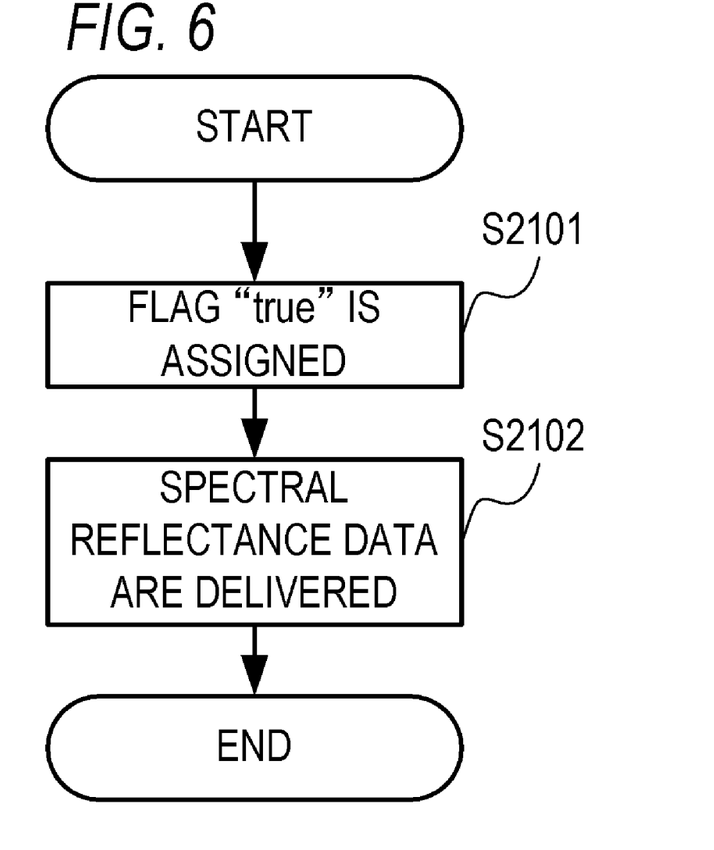
FIG. 6 is a flowchart illustrating an example of the operation flow of the server according to Practical Example 2.

The operation of the server 2001 will be explained below in greater detail. FIG. 6 illustrates the processing flow in the server 2001. The server 2001 starts the processing shown in FIG. 6 in response to the request to acquire the spectral reflectance data from the client apparatus.

The controller 2010 sets "true" as the faithful reproduction flag and assigns the flag to the spectral reflectance data for each pixel (data requested from the client apparatus) (S2101).

The controller 2010 then transmits the spectral reflectance data for each pixel that have been assigned with the faithful reproduction flag "true" to the client apparatus (S2102). Where the transmission of data is completed, the controller 2010 ends the present flow (image delivery processing).

Figure 7:
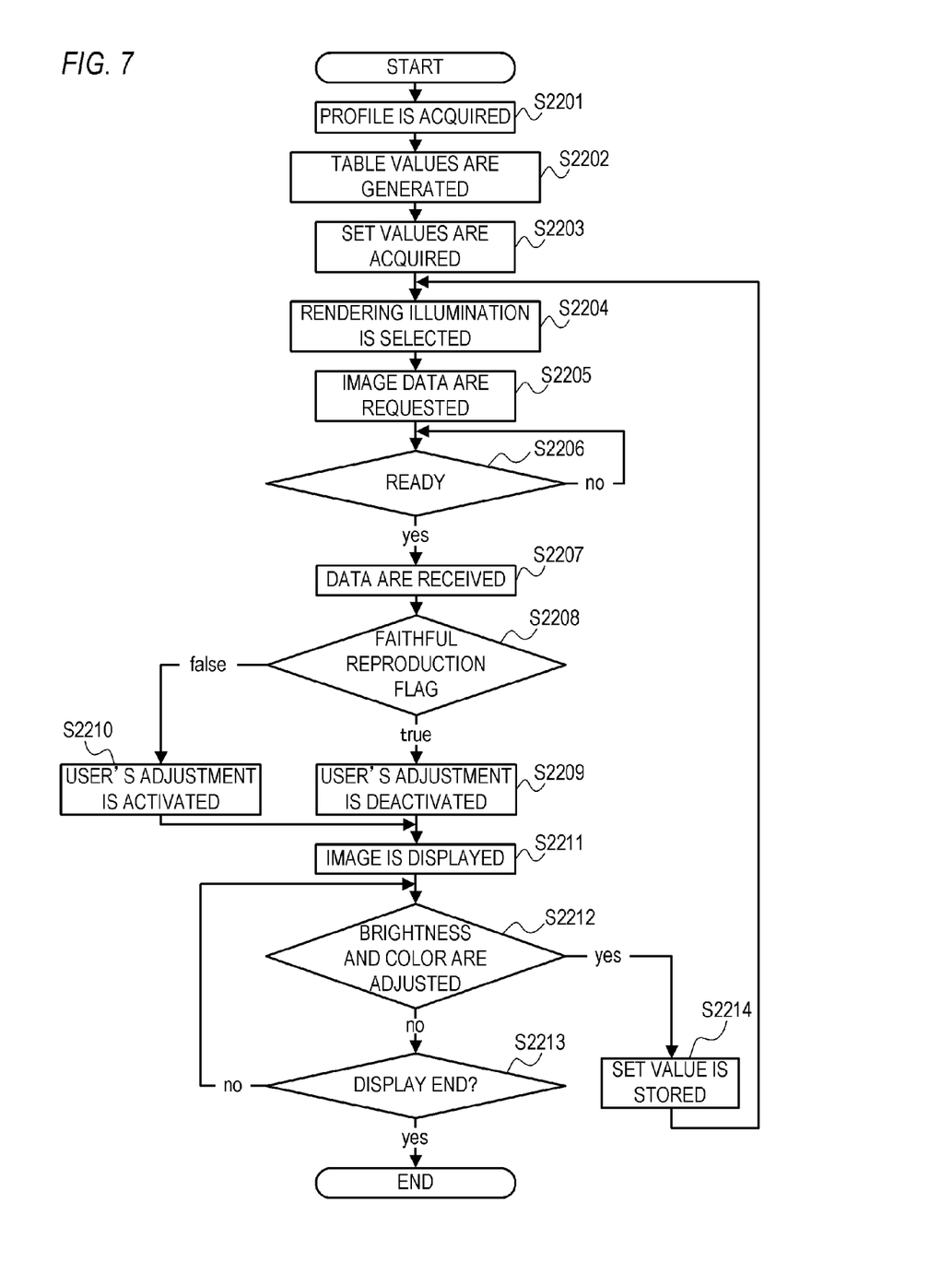
FIG. 7 is a flowchart illustrating an example of the operation flow of the PC according to Practical Example 2.

The operation of the PC 2002 is descried hereinbelow in greater detail. FIG. 7 shows the operation flow in the PC 2002.

First, the controller 2020 requests profile data of a monitor from the monitor 1021 (S2201). The monitor 1021 transmits the profile data of the monitor 1021 to the PC 2002 in response to the request. The transmitted profile data are stored in the profile processing unit 2025.

The controller 2020 controls the table value generation unit 2026, thereby generating the table values using the profile data stored in the profile processing unit 2025 (S2202).

The controller 2020 then requests from the monitor 1021 that the present set value of the adjustment parameter be transmitted (S2203). The monitor 1021 transmits the present set value of the adjustment parameter to the PC 2002 in response to this request. The transmitted value is stored in the parameter value acquisition unit 2027.

Then, the controller 2020 controls the rendering illumination database 2028, thereby selecting one illumination spectrum data stored in the rendering illumination database as rendering illumination spectrum data (S2204).

The controller 2020 then requests the transmission of spectral reflectance data from the server 2001 (S2205) and waits till the server 2001 completes the preparation for transmission of the spectral reflectance data (S2206).

Where the server 2001 completes the preparation for transmission of the spectral reflectance data, the spectral reflectance data for each pixel are inputted to the PC 2002 (S2207).

The controller 2020 then refers to the faithful reproduction flag assigned to the received spectral reflectance data and determines whether or not the received spectral reflectance data are the data that should faithfully reproduce and display the color (S2208).

In the case where the faithful reproduction flag "true" has been assigned, the controller 2020 instructs the monitor 1021 to deactivate the user's adjustment (S2209). This instruction is transmitted to the controller 1031 of the monitor 1021 via the communication interface 2024. The controller 1031 controls the adjustment value control unit 1038, thereby changing the set values of the adjustment parameters to the initial values with respect to the brightness adjustment unit 1032, color adjustment unit 1033, and backlight control unit 1035. The color reproduction characteristic of the monitor 1021 is thus matched with the color reproduction characteristic represented by the profile data that have been previously sent.

When the faithful reproduction flag "false" has been assigned, the controller 2020 instructs the monitor 1021 to activate the user's adjustment (S2210).

After S2209 or S2210, the controller 2020 controls the rendering illumination computation unit 2022 and the band conversion unit 2023, thereby generating RGB image data and displaying an image based on the RGB image data on the monitor 1021 (S2211). More specifically, the RGB image data are generated from the spectral reflectance data for each pixel that have been acquired in S2207.

The controller 2020 then receives the readjustment of the display brightness or display color performed by the user (S2212).

When the set value of the adjustment parameter has been changed, the controller 2020 stores the changed value in the parameter value acquisition unit 2027 and advances the processing to 2204. As a result, the rendering illumination spectral data are selected by using the newly set value of the adjustment parameter, and image data representing the appearance of the image pick-up object under the illumination corresponding to these data are generated.

An image (expected image) corresponding to the updated set value of the adjustment parameter can be displayed by the processing loop from S2212 to S2211 via S2214.

In the case where the set value of the adjustment parameter has not been changed, the controller 2020 performs image display till the end of image display is instructed by the user in S2213. Where the end of image display has been instructed, the controller 2020 ends the present flow.

As described hereinabove, according to the present example, similarly to Practical Example 1 an image that faithfully reproduces the color of the image pick-up object under the desired illumination can be displayed on the monitor, without burdening the user. Furthermore, abrupt changes in the display characteristic of the monitor can be inhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-105321, filed on May 10, 2011, and Japanese Patent Application No. 2012-081127, filed on Mar. 30, 2012, which are hereby incorporated by reference herein in their entirety.

What is claimed is:

1. An image display system constituted by a server that delivers image data and a display apparatus that displays an image based on the delivered image data, wherein the display apparatus has a function of adjusting a display characteristic by using a value of an adjustment parameter that has been set; and the server has:

a storage unit that stores a plurality of illumination spectrum data after associating the data with values of adjustment parameters that can be set in the display apparatus;

an acquisition unit that acquires a present set value of the adjustment parameter of the display apparatus;

a selection unit that selects, one of a plurality of illumination spectrum data stored in the storage unit, on the basis of a difference between a value of the adjustment parameter corresponding to the illumination spectrum data and a value of the adjustment parameter acquired by the acquisition unit;

a generation unit that generates image data representing appearance of an image pick-up object under illumination corresponding to the illumination spectrum data by using illumination spectrum data selected by the selection unit and data on spectral reflectance for each pixel; and a delivery unit that delivers image data generated by the generation unit to the display apparatus.

2. The image display system according to claim 1, wherein the generation unit generates reflection spectrum data for each pixel by using illumination spectrum data selected by the selection unit and data on spectral reflectance of each pixel; and generates image data for displaying by the display apparatus from the reflection spectrum data for each pixel by using profile data representing a color reproduction characteristic of the display apparatus.

3. The image display system according to claim 2, wherein the profile data are profile data representing the color reproduction characteristic of the display apparatus when a set value of an adjustment parameter is an initial value; and the display apparatus has a changing unit that changes the set value of the adjustment parameter to the initial value when an image is displayed that is based on image data delivered by the delivery unit.

4. The image display system according to claim 3, wherein the delivery unit delivers image data, which are generated by the generation unit, after assigning a flag thereto; and when the flag has been assigned to the delivered image data, the changing unit changes the set value of the adjustment parameter to the initial value.

5. An image display system constituted by a server that delivers data on a spectral reflectance of each pixel and a display apparatus that generates image data from the delivered data on a spectral reflectance of each pixel and displays an image based on the generated image data, wherein the display apparatus has:

an adjustment unit that adjusts a display characteristic by using a value of an adjustment parameter that has been set;

a storage unit that stores a plurality of illumination spectrum data after associating the data with values of adjustment parameters that can be set;

a selection unit that selects, one of a plurality of illumination spectrum data stored in the storage unit, on the basis of a difference between a value of the adjustment parameter corresponding to the illumination spectrum data and a present set value of the adjustment parameter;

a generation unit that generates image data representing appearance of an image pick-up object under illumination corresponding to the illumination spectrum data by using illumination spectrum data selected by the selection unit and the delivered data on spectral reflectance for each pixel; and a display unit that displays an image based on the image data generated by the generation unit.

6. The image display system according to claim 5, wherein the generation unit generates reflection spectrum data for each pixel by using illumination spectrum data selected by the selection unit and data on spectral reflectance of each pixel that have been delivered; and generates image data for displaying by the display unit from the reflection spectrum data for each pixel by using profile data representing a color reproduction characteristic.

7. The image display system according to claim 6, wherein the profile data are profile data representing a color reproduction characteristic when a set value of an adjustment parameter is an initial value; and the display apparatus further has a changing unit that changes the set value of the adjustment parameter to the initial value when the display unit displays an image based on image data generated by the generation unit.

8. The image display system according to claim 7, wherein the server delivers data on spectral reflectance for each pixel, after assigning a flag thereto; and when the flag has been assigned to the delivered data on spectral reflectance for each pixel, the changing unit changes the set value of the adjustment parameter to the initial value.

9. A server that delivers image data to a display apparatus that displays an image based on the delivered image data, wherein the display apparatus has a function of adjusting a display characteristic by using a value of an adjustment parameter that has been set; and the server has:

a storage unit that stores a plurality of illumination spectrum data after associating the data with values of adjustment parameters that can be set in the display apparatus;

an acquisition unit that acquires a present set value of the adjustment parameter of the display apparatus;

a selection unit that selects, one of a plurality of illumination spectrum data stored in the storage unit, on the basis of a difference between a value of the adjustment parameter corresponding to the illumination spectrum data and a value of the adjustment parameter acquired by the acquisition unit;

a generation unit that generates image data representing appearance of an image pick-up object under illumination corresponding to the illumination spectrum data by using illumination spectrum data selected by the selection unit and data on spectral reflectance for each pixel; and a delivery unit that delivers image data generated by the generation unit to the display apparatus.

10. A display apparatus that generates image data from delivered data on a spectral reflectance of each pixel and displays an image based on the generated image data, the display apparatus comprising:
an adjustment unit that adjusts a display characteristic by using a value of an adjustment parameter that has been set;
a storage unit that stores a plurality of illumination spectrum data after associating the data with values of adjustment parameters that can be set;
a selection unit that selects, one of a plurality of illumination spectrum data stored in the storage unit, on the basis of a difference between a value of the adjustment parameter corresponding to the illumination spectrum data and a present set value of the adjustment parameter;
a generation unit that generates image data representing appearance of an image pick-up object under illumination corresponding to the illumination spectrum data by using illumination spectrum data selected by the selection unit and the delivered data on spectral reflectance for each pixel; and
a display unit that displays an image based on the image data generated by the generation unit.

11. A control method for an image display system constituted by a server that delivers image data and a display apparatus that displays an image based on the delivered image data, with the display apparatus being configured to have a function of adjusting a display characteristic by using a value of an adjustment parameter that has been set, the control method comprising:
an acquisition step in which the server acquires a present set value of the adjustment parameter of the display apparatus;
a selection step in which the server selects, one of a plurality of illumination spectrum data stored in the storage unit after associating the data with values of adjustment parameters that can be set in the display apparatus on the basis of a difference between a value of the adjustment parameter corresponding to the illumination spectrum data and a value of the adjustment parameter acquired in the acquisition step;
a generation step in which the server generates image data representing appearance of an image pick-up object under illumination corresponding to the illumination spectrum data by using illumination spectrum data selected in the selection step and data on spectral reflectance for each pixel; and
a delivery step in which the server delivers image data generated in the generation step to the display apparatus.

12. A control method for an image display system constituted by a server that delivers data on spectral reflectance for each pixel and a display apparatus that generates image data from the delivered spectral reflectance for each pixel and displays an image based on the generated image data, the control method comprising:
an adjustment step in which the display apparatus adjusts a display characteristic by using a value of an adjustment parameter that has been set;
a selection step in which the display apparatus selects, one of a plurality of illumination spectrum data stored in the storage unit after associating the data with values of adjustment parameters that can be set, on the basis of a difference between a value of the adjustment parameter corresponding to the illumination spectrum data and a present set value of the adjustment parameter;
a generation step in which the display apparatus generates image data representing appearance of an image pick-up object under illumination corresponding to the illumination spectrum data by using illumination spectrum data selected in the selection step and the delivered data on spectral reflectance for each pixel; and
a display step in which the display apparatus displays an image based on image data generated in the generation step.

13. The image display system according to claim 1, wherein
the selection unit selects illumination spectrum data with a smallest difference between a value of the adjustment parameter corresponding to the illumination spectrum data and a value of the adjustment parameter acquired by the acquisition unit.

14. The image display system according to claim 5, wherein
the selection unit that selects illumination spectrum data with a smallest difference between a value of the adjustment parameter corresponding to the illumination spectrum data and a present set value of the adjustment parameter.

15. The control method according to claim 11, wherein
in the selection step, illumination spectrum data with a smallest difference between a value of the adjustment parameter corresponding to the illumination spectrum data and a value of the adjustment parameter acquired by the acquisition step is selected.

16. The control method according to claim 11, wherein
in the generation step,
reflection spectrum data is generated for each pixel by using illumination spectrum data selected by the selection step and data on spectral reflectance of each pixel; and
image data for displaying by the display apparatus are generated from the reflection spectrum data for each pixel by using profile data representing a color reproduction characteristic of the display apparatus.

17. The control method according to claim 16, wherein
the profile data are profile data representing the color reproduction characteristic of the display apparatus when a set value of an adjustment parameter is an initial value; and
the control method further comprises a changing step in which the display apparatus changes the set value of the adjustment parameter to the initial value when an image is displayed that is based on image data delivered by the delivery step.

18. The control method according to claim 17, wherein
in the delivery step, image data which are generated by the generation step, are delivered after assigning a flag thereto; and
when the flag has been assigned to the delivered image data, in the changing step, the set value of the adjustment parameter is changed to the initial value.

19. The control method according to claim 12, wherein
in a selection step, illumination spectrum data with a smallest difference between a value of the adjustment parameter corresponding to the illumination spectrum data and a present set value of the adjustment parameter is selected.

20. The control method according to claim 12, wherein
in the generation step,
reflection spectrum data is generated for each pixel by using illumination spectrum data selected by the selection step and data on spectral reflectance of each pixel that have been delivered; and image data for displaying by the display step are generated from the reflection spectrum data for each pixel by using profile data representing a color reproduction characteristic.

* * * * *